US012647813B2

(12) United States Patent
Jain et al.

(10) Patent No.: US 12,647,813 B2
(45) Date of Patent: Jun. 2, 2026

(54) SYSTEM AND METHOD FOR SELECTING WIRELESS FIDELITY (WI-FI) CHANNEL FOR MITIGATING INTERFERENCES

(71) Applicant: SAMSUNG ELECTRONICS CO., LTD., Suwon-si (KR)

(72) Inventors: Abhinav Jain, Uttar Pradesh (IN); Amit Jain, Uttar Pradesh (IN); Prabhat Kumar, Uttar Pradesh (IN); Ankit Guleria, Uttar Pradesh (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 732 days.

(21) Appl. No.: 18/084,963

(22) Filed: Dec. 20, 2022

(65) Prior Publication Data

US 2024/0121653 A1    Apr. 11, 2024

(30) Foreign Application Priority Data

Sep. 29, 2022    (IN) ............................. 202241056041

(51) Int. Cl.
H04W 28/02 (2009.01)

(52) U.S. Cl.
CPC .................. H04W 28/0236 (2013.01); H04W 28/0289 (2013.01)

(58) Field of Classification Search
CPC ...................... H04W 28/0236; H04W 28/0289
See application file for complete search history.

(56) References Cited

U.S. PATENT DOCUMENTS

| | | | |
|---|---|---|---|
| 6,169,728 B1 * | 1/2001 | Perreault .......... | H04N 21/64753 370/235 |
| 9,602,389 B1 * | 3/2017 | Maveli .................... | H04L 69/22 |
| 10,932,170 B2 | 2/2021 | Fitzpatrick | |
| 2005/0176420 A1 * | 8/2005 | Graves ................ | H04W 88/021 455/423 |
| 2006/0098592 A1 * | 5/2006 | Proctor, Jr. ........... | H04W 16/26 370/315 |
| 2006/0291413 A1 * | 12/2006 | Rossier ................. | H04W 16/10 370/329 |
| 2008/0112340 A1 * | 5/2008 | Luebke ............... | H04W 72/542 370/310 |

(Continued)

FOREIGN PATENT DOCUMENTS

| | | | |
|---|---|---|---|
| CN | 104244301 B | * | 11/2017 |
| CN | 107395297 | | 11/2017 |

(Continued)

*Primary Examiner* — Mehmood B. Khan
(74) *Attorney, Agent, or Firm* — Nixon & Vanderhye P.C.

(57) ABSTRACT

Certain example embodiments relate to a method for selecting wireless ridelity (Wi-Fi) channel for mitigating and/or reducing interference, wherein the method may detect the presence of nearby access points and determine the number of access points by an access point detector module. The method may determine the minimum value of received signal strength indicator (RSSI) by the access point detector module, and may determine the congestion information from the nearby devices by a peer congestion observer module. Furthermore, the method may calculate at least one weighted parameter and select a preferred channel to create a hotspot for communication by a channel selector module.

18 Claims, 6 Drawing Sheets

(56)     References Cited

U.S. PATENT DOCUMENTS

| | | | | |
|---|---|---|---|---|
| 2008/0298249 A1* | 12/2008 | Baker | .................. | H04W 48/20 |
| | | | | 370/238 |
| 2012/0213110 A1* | 8/2012 | Yamaguchi | ......... | H04W 72/541 |
| | | | | 370/252 |
| 2012/0276944 A1* | 11/2012 | Liao | ..................... | H04L 5/0023 |
| | | | | 455/524 |
| 2015/0334179 A1* | 11/2015 | Eisenbud | ........... | H04L 67/1023 |
| | | | | 709/226 |
| 2017/0063484 A1* | 3/2017 | Naghshvar | ........... | H04J 11/0023 |
| 2017/0332334 A1* | 11/2017 | Liu | ..................... | H04W 52/265 |
| 2018/0255476 A1 | 9/2018 | Alisawi | | |
| 2020/0314962 A1* | 10/2020 | Abou Saleh | .......... | H04W 24/02 |
| 2022/0248287 A1* | 8/2022 | Chong | ................. | H04W 24/02 |
| 2024/0121653 A1* | 4/2024 | Jain | .................. | H04W 28/0289 |
| 2025/0159518 A1* | 5/2025 | Muruganathan | ...... | H04L 5/0051 |

FOREIGN PATENT DOCUMENTS

| | | | | | |
|---|---|---|---|---|---|
| CN | 108055671 | | 5/2018 | | |
| CN | 106470446 | B * | 10/2019 | ........ | H04W 36/0011 |
| CN | 108966361 | | 6/2021 | | |
| CN | 116761200 | A * | 9/2023 | ........... | H04W 24/08 |
| CN | 118215134 | A * | 6/2024 | ........... | H04W 60/00 |
| CN | 120474185 | A * | 8/2025 | | |
| EP | 2874436 | B1 * | 9/2018 | ........... | H04W 36/06 |
| JP | 4489294 | B2 * | 6/2010 | ......... | H04W 72/541 |
| WO | WO-2004073243 | A2 * | 8/2004 | ........... | H04W 16/10 |
| WO | WO-2012171292 | A1 * | 12/2012 | ........... | H04B 17/318 |
| WO | WO-2020164256 | A1 * | 8/2020 | ........... | H04B 17/345 |

\* cited by examiner

SYSTEM AND METHOD FOR SELECTING WIRELESS FIDELITY (WI-FI) CHANNEL FOR MITIGATING INTERFERENCES

CROSS REFERENCE TO RELATED APPLICATIONS

This application is based on and claims priority under 35 U.S.C. § 119 to Indian Patent Application Serial No. 202241056041 (CS), filed on Sep. 29, 2022, in the Indian Patent Office, the disclosure of which is hereby incorporated by reference herein in its entirety.

BACKGROUND

Field

Certain example embodiments relate to a system and/or method for selecting a wireless fidelity (Wi-Fi) channel for mitigating interferences. Certain example embodiments relate to optimal channel selection among multiple candidate channels to reduce congestion while using a Mobile Hotspot.

Description of Related Art

A wireless fidelity (Wi-Fi) hotspot may be created by installing an access point to an internet connection. The access point transmits a wireless signal over a short distance. The Wi-Fi hotspots and other wireless networks are becoming prevalent and essential resources for enabling Wi-Fi roaming and enhancing network data handling. The capabilities of mobile devices that can support communication over such wireless networks are constantly expanding. The capability of such mobile devices to support the communications with various wireless networks can be advantageous in increasing the likelihood that, at least one wireless network in the area of the mobile device can be used to facilitate wireless services.

Wi-Fi channels are smaller bands within the Wi-Fi frequency bands that the wireless networks use to send and receive data. There are a limited number of Wi-Fi channels available depending on the frequency band used by the router. In most communication environments involving short range or long-range wireless communications, interference from unanticipated wireless sources can have an adverse effect on the performance of the communication system resulting in lower throughput, dropped calls and reduced bandwidth that can cause traffic congestion, or other unfavorable effects. An example reason that certain channels aren't the best choice to use is because of interference. There are various interference causes such as co-channel interference wherein numerous devices compete for time to talk on the same channel, adjacent-channel interference wherein the devices from overlapping channels are trying to talk over each other. The channel(s) with the most interference is those that overlap with each other. The channels that have interference from other devices are considered to be crowded, and the crowded devices take longer time to transmit the data. The conventional technique for selecting Wi-Fi channel works by accessing point first scanning for all wireless channel's utilized within the vicinity followed by the calculation of the interference factor and upon completion the "cleanest" channel is selected periodically. The interference factor is the ratio of the observed busy time over the time spent by the user on the channel, the value is further amplified by the observed noise floor on the channel in comparison to the lowest noise floor observed on the entire band. The existing prior art includes auto selection of the channel on the mobile hotspot (MHS) device with limited set of factors and considers only the devices in its vicinity thereby neglecting the data from other such devices in the vicinity of the user which may cause congestion and interference to Wi-Fi communication between the MHS device and the user device.

However, the prior art does not, for example and without limitation, disclose details pertaining to using data from nearby device to find the interference intensity of channel(s) and to increase throughput/network speed of the connection by optimal channel selection to reduce congestion while using a mobile hotspot.

Another prior art discloses automatically selecting a wireless communication network for a user equipment device, which may include generating in a processor of a network selection policy server an enhanced network selection rule that includes information suitable for causing the user equipment device to automatically evaluate a condition and determine whether to transition from using a first wireless communication network to using a second wireless communication network, and sending the generated enhanced network selection rule to the user equipment device so as to cause the user equipment device to automatically evaluate the condition and determine whether to transition from using the first wireless communication network to using the second wireless communication network, wherein the first wireless communication network may be a cellular network and the second wireless communication network may be a Wi-Fi network. In a further aspect, generating the enhanced network selection rule includes information suitable for causing the user equipment device to automatically evaluate the condition and determine whether to transition from using the first wireless communication network to using the second wireless communication network, which may further include generating the enhanced network selection rule to include information suitable for causing the user equipment device to evaluate whether a value of a radio link property of the first wireless communication network meets or exceeds a threshold value of acceptable radio link properties and transition to the second wireless communication network when the value of the radio link property of the first wireless communication network does not meet or exceed the threshold value of acceptable radio link properties. In a further aspect, generating the enhanced network selection rule that includes information suitable for causing the user equipment device to automatically evaluate the condition and determine whether to transition from using the first wireless communication network to using the second wireless communication network may include generating the enhanced network selection rule to include information suitable for causing the user equipment device to evaluate whether a value of a radio link property of the second wireless communication network meets or exceeds a threshold value of acceptable radio link properties and transition to the second wireless communication network when the value of the radio link property of the second wireless communication network measured in the user equipment device meets or exceeds the threshold value of acceptable radio link properties. However, the prior art only discloses creating a network selection system on client device/user equipment (UE) based upon several parameters of the network (access point: AP). The network selection rules are based upon several features namely network availability, time, signal strength, signal to noise ratio (SNR), link speed, and cellular network radio parameters, and does not involve details pertaining to using data from nearby device to find the interference intensity of channel and to increase throughput/ network speed of the connection by optimal channel selection to reduce congestion while using a mobile hotspot.

Another prior art discloses systems and methods for recognizing congestion in a mobile network to make intelligent decisions regarding connecting to an operator network. A mobile device having a local proxy equipped with congestion recognition capabilities can use the elapsed time to establish connection with a mobile base station in the mobile network to recognize the congestion at the mobile base station. Further, in response to recognizing the congestion at the mobile base station, the local proxy can selectively block traffic from the mobile device from traversing the mobile network to reduce signaling overload on the mobile network. The method further discloses a single mobile device able to detect the congestion independently from any other mobile devices and without any form of communication with a server-side component. The ability to make the determination regarding congestion in the network, independently, is an important feature because under congestion conditions, communication with the device is not guaranteed and any form of communication causes additional load on the already congested network. Each congestion recognition instance on a mobile device decides on its own by studying measurements collected naturally by a local proxy on the mobile device. Once a congestion is recognized in the given operator network by the congestion recognition component, the local proxy in the proxy system applies a blocking policy to minimize the traffic outgoing from the mobile device to ease the congestion. However, the prior art only discloses recognizing the mobile network congestion on the client device using some static parameters namely time consumed, signal strength data, connection rejection message, and does not disclose details pertaining to using data from nearby device to find the interference intensity of channel and to increase throughput/network speed of the connection by optimal channel selection to reduce congestion while using a mobile hotspot.

Hence, there exists a need for a method to determine, for example, a least congested Wireless Fidelity (Wi-Fi) channel with increased transmission efficiency.

SUMMARY

Certain example embodiments involve a method for selecting wireless fidelity (Wi-Fi) channel(s) for mitigating and/or reducing interference. An example method may comprise one or more of: accumulating packet information on each channel from a driver by a packet information collector module, detecting the presence of nearby access points and determining the number of access points on each channel by an access point detector module, determining a minimum value of received signal strength indicator (RSSI) by the access point detector module, determining congestion information from the nearby devices by a peer congestion observer module, and/or a most preferred channel(s) to create a hotspot for communication between a mobile hotspot (MHS) device and a user interface device may be selected based on weighted parameters by a channel selector module. "Based on" as used herein covers based at least on.

In certain example embodiments, a method for selecting a Wi-Fi channel for mitigating interferences may include one or more of: receiving the packet information from a packet sniffer and sending a probe request by the MHS device to nearby devices, based on a peer congestion observer module; receiving the probe request, packet information, a number of access points on each channel nearby the MHS device for nearby devices; transferring received information is to the MHS device by nearby device(s) as a probe response; collecting information received from the packet information; and/or calculating a weighted parameter(s) and determining the most preferred channel to create the hotspot for communication between the MHS device and the user interface device.

Certain example embodiments relate to a system for selecting a Wi-Fi channel for mitigating interferences, wherein the system may comprise at least one processor for accumulating packet information on each channel of a plurality of channels from a driver, detecting presence of access points nearby a MHS device, determining a number of access points on each channel, and/or determining a minimum value of RSSI.

Certain example embodiments may include at least one processor for determining the congestion information from all the nearby devices, calculating the weighted parameter(s), and selecting the most preferred channel to create a hotspot for communication between the MHS device and the user interface device based on weighted parameter(s).

Thus, certain example embodiments may provide a method for selecting Wi-Fi channel for mitigating and/or reducing interference. The method may also help to increase the throughput/network speed of a connection by optimal channel selection, thereby reducing the congestion while using a Mobile Hotspot. The method may also make efficient use of Wi-Fi Hotspot bandwidth and/or provide improved portability and/or an improved client device user experience.

At least one of the plurality of modules may be implemented through an AI model, by way of at least one processor comprising processing circuitry. A function associated with AI may be performed through the non-volatile memory, the volatile memory, and the at least one processor. The processor may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors may control the processing of the input data in accordance with a predefined operating rule or artificial intelligence (AI) model stored in the non-volatile memory and the volatile memory. The predefined operating rule or artificial intelligence model may be provided through training or learning. Here, being provided through learning may indicate that, by applying a learning algorithm to a plurality of learning data, a predefined operating rule and/or AI model of a desired characteristic may be made. The learning may be performed in a device itself in which AI according to an example embodiment may be performed, and/or may be implemented through a separate server/system.

An example AI model may be of or include a plurality of neural network layers. Each layer may comprise a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks. The learning algorithm may involve a technique for training a predetermined target device (for example, a robot) using a plurality of learning data to cause, allow, and/or control the target device to make a determination and/or prediction. Examples of learning algorithms include, but are not limited to, supervised learning, unsupervised learning, semi-supervised learning, or reinforcement learning.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION

Reference will now be made in detail to the description of subject matter, one or more examples of which are shown in figures. Each example is provided to explain the subject matter and not a limitation. Various changes and modifications obvious to one skilled in the art to which certain example embodiments pertain are deemed to be within the spirit, scope and contemplation of certain example embodiments.

Figure 1A:
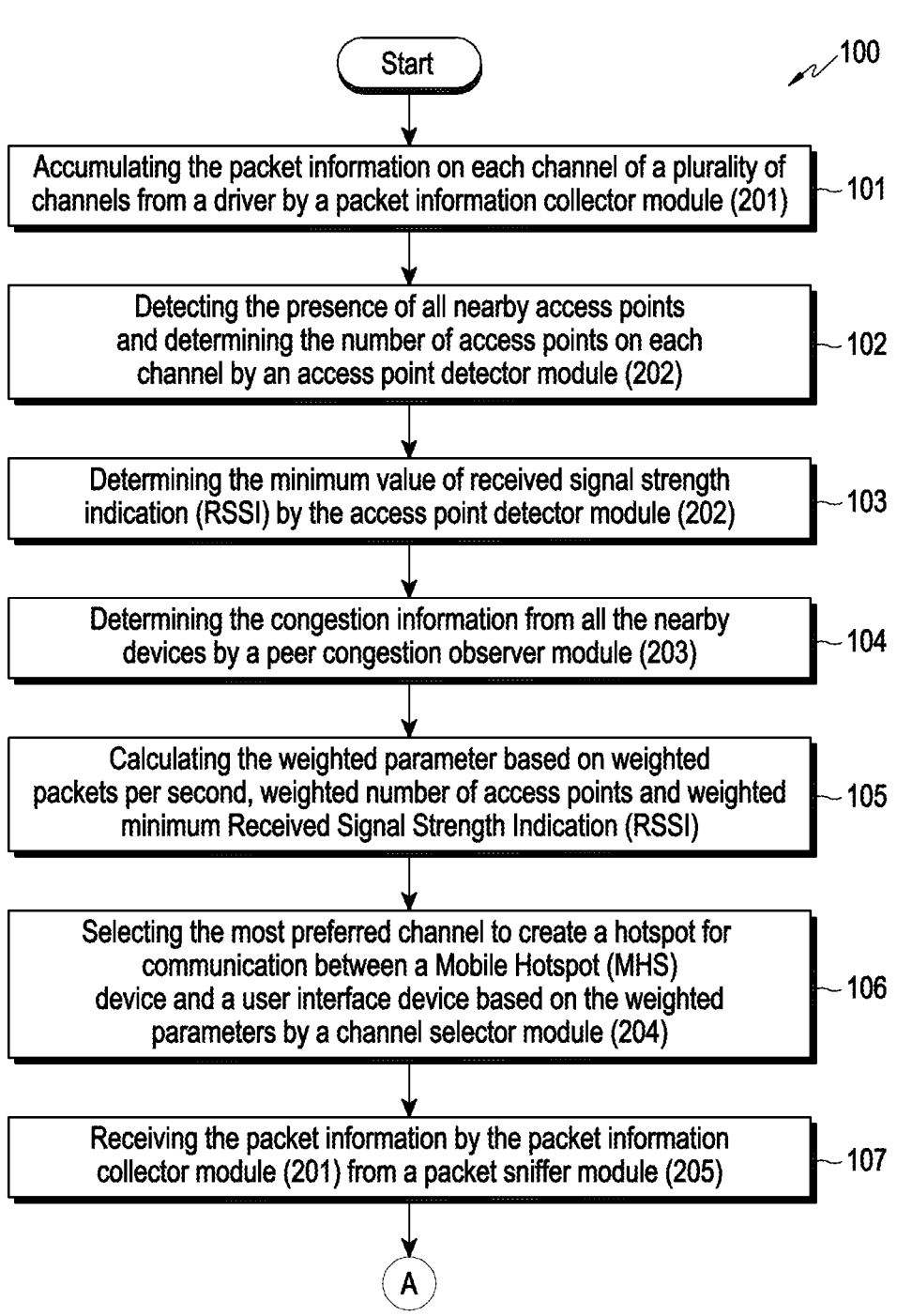
FIGS. 1A and 1B illustrate a flowchart of an example embodiment for selecting a wireless fidelity (Wi-Fi) channel for mitigating and/or reducing interferences.
Figure 1B:
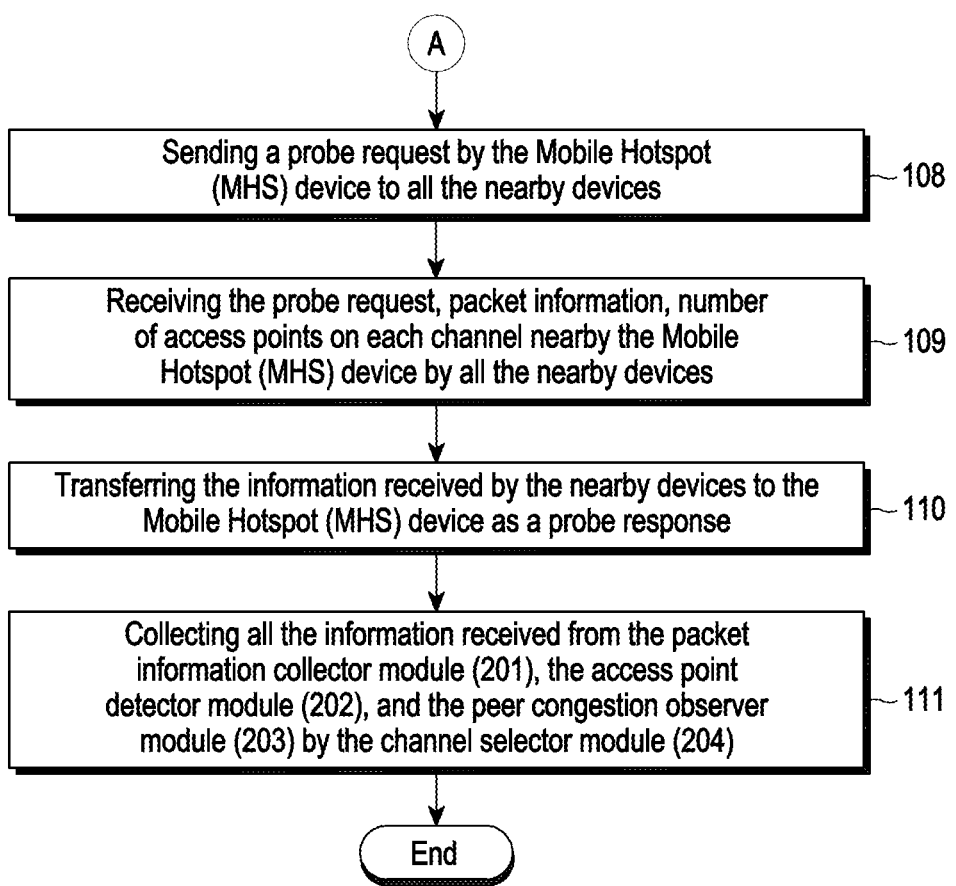

Referring now to FIGS. 1A and 1B, a flowchart of the method for selecting a wireless fidelity (Wi-Fi) channel for mitigating and/or reducing interferences is illustrated, wherein the method 100 comprises the steps of accumulating the packet information on each channel of a plurality of channels from a driver by a packet information collector module in the operation 101. In an embodiment, the packet information on each channel of the plurality of channels may be obtained from a driver, preferably a Wi-Fi driver. In certain example embodiments, the packet information may include the packets per second on a channel as perceived by the mobile hotspot (MHS) device. In an embodiment, the packet information is stored and synced to the nearby devices by a native packet sync module 206.

In operation 102, the presence of all nearby access points are detected and the number of access points on each channel is determined by an access point detector module 202. In an embodiment, the number of access points is retrieved using WIFICond process, wherein the WIFICond process returns the value by identifying various types of beacons. In an embodiment, the wireless local area network (WLAN) framework includes an independent process referred as WIFICond, which is located in system/connectivity and the WIFICond process communicates with the WLAN driver through some standard commands.

In the operation 103, the minimum value of received signal strength indicator (RSSI) is determined by the access point detector module 202. In an embodiment, the minimum value of RSSI is retrieved from the beacons of the access points received by the driver preferably a Wi-Fi driver. The RSSI is a rough estimate of an ability of the device to hear, detect, and receive signals from any wireless access point or Wi-Fi router. Further, RSSI is an indication of the power level being received by the receiving radio after the antenna and possible cable loss.

Further, in operation 104, the congestion information from all the nearby devices is determined by a peer congestion observer module 203. In operation 105, the weighted parameter is calculated, wherein the weighted parameter is calculated based on weighted packets per second, weighted number of access points and weighted minimum RSSI. Further, in operation 106 the most preferred channel is selected to create a hotspot for communication between a MHS device and a user interface device based on the weighted parameters by a channel selector module 204. In an embodiment, the weighted parameters may be computed using a weighing factor determined for each nearby device based on its proximity to the MHS device.

In operation 107, the packet information is received by the packet information collector module 201 from a packet sniffer module 205. In operation 108, a probe request is sent by the MHS device to all the nearby devices, upon being triggered by the peer congestion observer module 203.

In operation 109, the probe request, the packet information, the number of access points on each channel nearby the MHS device is received by all the nearby devices. In operation 110, the information received by the nearby devices is transferred to the MHS device as a probe response.

Furthermore, in operation 111, all the information received from the packet information collector module 201, the access point detector module 202, and the peer congestion observer module 203 is collected by the channel selector module 204 for determining the most preferred channel to create the hotspot for communication between the MHS device and the user interface device. Each "module" herein may comprise processing circuitry. At least one processor, comprising processing circuitry, may be used to implement one or more of the modules discussed herein. Each processor herein comprises processing circuitry.

In an embodiment, the MHS devices connect to a cellular network, like $4^{th}$ generation (4G) mobile network or $5^{th}$ generation (5G) mobile network. Further, all the other devices that cannot connect to a particular cellular network, can connect to the mobile hotspot using Wi-Fi, wherein the mobile hotspot acts as a bridge between the device and the cellular network.

Figure 2:
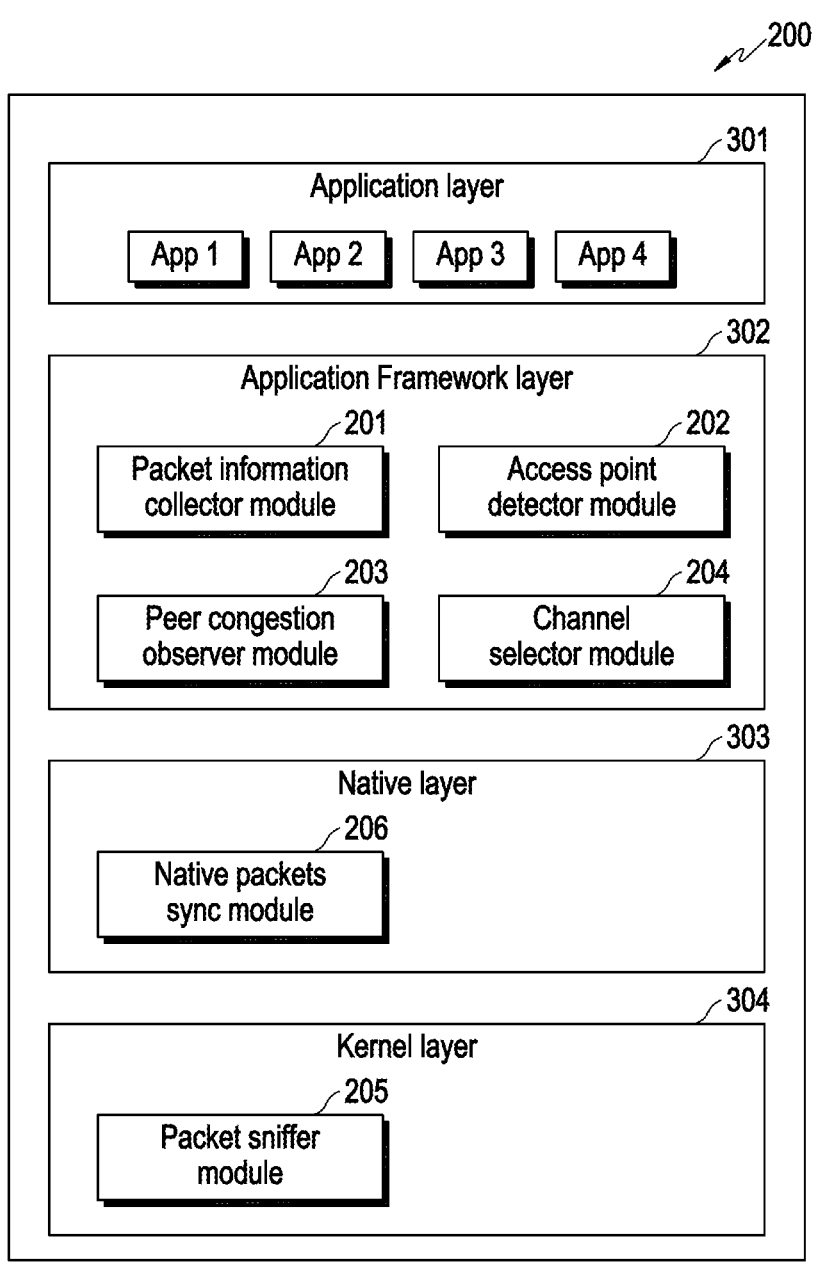
FIG. 2 illustrates a block diagram of a example system for selecting a wireless fidelity (Wi-Fi) channel for mitigating and/or reducing interferences.

Referring to FIG. 2, a block diagram of a system for selecting the Wi-Fi channel for mitigating interferences is illustrated. In an embodiment, the system 200 preferably an android architecture may comprise four layers namely an application layer 301, an application framework layer 302, a native layer (03 and a kernel layer 304 as will be apparent to persons skilled in the relevant art(s).

In an embodiment, the application layer 301 which forms the top layer of the system 200 includes pre-installed applications like home, contacts, camera, gallery and all the third-party applications downloaded from the play store such as chat applications, games and like are installed on the application layer. The application layer 301 runs within the android run time with the help of the classes and services provided by the application framework layer.

In an embodiment, the system 200 comprises an application framework layer 302 comprising a packet information collector module 201 for accumulating packet information on each channel of a plurality of channels from a driver. Further, the application framework layer 302 comprises an access point detector module 202 for detecting the presence of all access points nearby a MHS device. Furthermore, the access detector module 202 of the application framework layer 302 is configured to determine the number of access points on each channel and determine minimum (e.g., a small) value of RSSI.

Further, the application framework layer 302 comprises a peer congestion observer module 203 for determining congestion information from all the nearby devices, and a channel selector module 204 for calculating at least one weighted parameter and further, selecting the most preferred channel to create a hotspot for communication between a MHS device and a user interface device based on the at least one weighted parameter.

The channel selector module 204 may collect all the information received from the packet information collector module 201, access point detector module 202, and peer congestion observer module 203, for determining the most preferred channel to create the hotspot for communication between the MHS device and the user interface device. In an embodiment, the channel selector module 204 takes parameter values, more particularly tabulated values by the packet information collector module 201 as input and then calculates weighted parameter values for selecting the most preferred channel to create the hotspot for communication between MHS device and the user device. In an embodiment, the weighted values are calculated with the help of a weighing factor (w.f) determined for each nearby device based on its distance from the Mobile MHS device. For instance, if distance of a nearby device is the range of (x–1, x) distance from the MHS device, then weighing factor (w.f)=1/x, for a device at a distance of 1.5 meters from the MHS device, then weighing factor (w.f)=1/2. The weighted parameter values are calculated as—

Weighted Packets per second $$\text{Packets}_{weighted}=\text{Packets}_{MHS}+\Sigma(w.f)\times\text{Packets}_{nearby\ devices} \quad (1)$$

Weighted number of access points $$\text{Number of access points}_{weighted}=\text{Number of access points}_{MHS}+\Sigma(w.f)\times\text{Number of access points}_{nearby\ devices} \quad (2)$$

Weighted minimum RSSI $$\text{Min RSSI}_{weighted}=\text{Minimum}(\text{Min RSSI}_{MHS},(1/w.f)\times\text{Min RSSI}_{nearby\ devices}) \quad (3)$$

According to an embodiment, the application framework layer 302 may provide several important classes, used to create an Android application. Further, the application framework layer 302 provides a generic abstraction for hardware access and also helps in managing the user interface with application resources.

In an embodiment, the channel selector module 204 may consider various parameters for selecting the optimal channel, wherein the parameters may include packets per second, number of access points and minimum value of RSSI. For instance, the weighted parameter for the channel 1, 2, 6 and 11 are computed. The values of packet per second are considered such as 1400, 1100, 700 and 200 for the respective channels. The values of number of access points are considered as 7, 4, 4 and 3 for the respective channels and further the values of minimum RSSI are considered as –60, –50, –60 and –68 for the respective channels. In normal scenario, the MHS device may choose channel 6 without considering the data from upcoming client/user. In certain example embodiments, the channel 11 may be selected after considering data from the upcoming client/user.

In an embodiment, the system 200 may comprise a native layer 303, wherein the native layer 303 may further comprises a native packets sync module 206 configured to store and sync the packet information accumulated by the packet information collector module 201 to the nearby devices. The peer congestion observer module 203 may be triggered for sending a probe request by a MHS device to all the nearby devices using a native packets sync module 206.

According to an embodiment, the native layer 303 may include Android's native libraries. The native libraries carry a set of instructions to guide the device in handling different types of data. The playback and recording of various audio and video formats are guided by the media framework library.

In an embodiment, the system 200 may comprise a kernel layer 304, wherein the kernel layer 304 may include a packet sniffer module 205 for providing packet information to the packet information collector module 201. The packet sniffer module 205 captures the packets on each channel, calculates the packets frequency, and calculates the minimum (e.g., a small) value of RSSI on all the channels.

According to an embodiment, the kernel layer 304 may manage all the available drivers such as display drivers, camera drivers, Bluetooth drivers, audio drivers and memory drivers, which are required during the runtime. The kernel layer 304 provides an abstraction layer between the device hardware and the other components of the android architecture. The kernel layer 304 is responsible for management of memory, power, devices and the like. According to an embodiment, the various features of the kernel layer 304 may include handling the security between the application and the system, handling the memory management thereby providing the freedom to develop applications, allocating resources to processes, handling the network communication. The packet information collector module 201 accumulates the packet information on each channel of the plurality of channels from a driver. The packet information includes the packets per second on each channel as perceived by the Mobile MHS device. In an example embodiment, the packets per second may indicate the amount of traffic on a channel, thus, a channel with a higher packet frequency has more traffic overall, which may further interfere with communication between the MHS device and the user device. Therefore, it is less recommended to use a channel with a higher packet frequency.

As per an example user case, consider the mobile hotspot is turned ON and the congestion affects the throughput in a network. More particularly, the network congestion occurs when a network is overrun with more data packet traffic than it can cope with. Further, in a congested network, the time taken by a packet to reach its destination increases significantly, hence a higher latency rate is observed. The mobile hotspot device may create a mobile hotspot on channel 5, as the device A is unaware of channel 5 congestion by television on device A. The device A is located nearby the MHS device. The congestion of nearby devices may be fetched by the various modules of the embodiment such as the MHS device may get congestion information from the device A, and same will be shared to MHS device. Further, the mobile hotspot may not be created on channel 5, and because of the implementation of certain example embodiments the best channel for best throughput may be selected to enhance the user experience.

Figure 3:
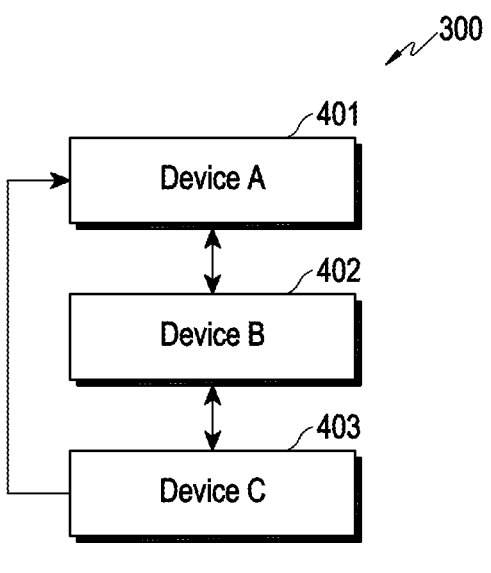
FIG. 3 illustrates a first use case according to an example embodiment.

Referring to FIG. 3, an example user case according to an embodiment is illustrated, wherein a scenario is considered such that the congestion observed by device A 401 due to device B 402 on a particular channel (say channel 5) is denoted by X, further the congestion observed by device A 401 due to device C 403 on the channel denoted by X', and furthermore, the congestion observed by device B 402 due to device C 403 on the channel is denoted by Y. Further, consider the total congestion on the channel observed by the device A 401 is given as X+X' and the total congestion on the channel observed by the device B 402 is given as X+Y. As per the conventional technique, the device A 401 acquires information only about the congestion on a particular channel when creating a hotspot, it does not have information about congestion on all the channels in the vicinity, whereas with the implementation of certain example embodiments, while forming a hotspot, the device A 401 is aware of the congestion of all related/associated channels in the vicinity. Furthermore, the information from the related/associated channels in the vicinity of the user device is useful in determining the overall congestion information (such as Y) in the vicinity and is extremely crucial when the device A 401 is in motion. As it gets closer to device C 403, the overall congestion information becomes more important.

Figure 4:
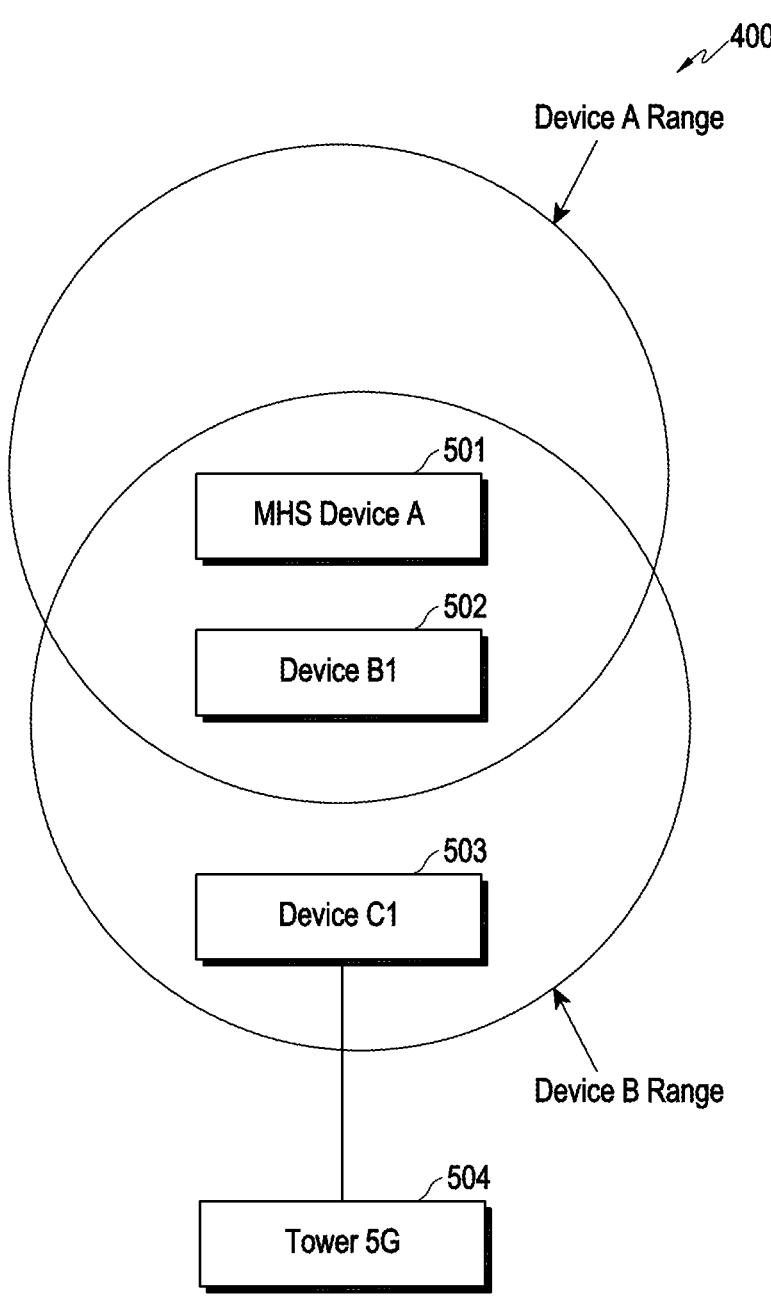
FIG. 4 illustrates another use case of an example embodiment.

As per another example user case of certain example embodiments illustrated with the help of a FIG. 4, consider a user device Cl 503 engaged in 5G call, wherein the network is transmitted via the tower 5G 504 but at the same time the user device Cl 503 is not in direct contact of the MHS device A 501, the hotspot device A 501 may create a channel on the same channel as of the 5G calling channel, therefore it may create a huge impact on the call. With the implementation of certain example embodiments, the hotspot device may receive all the information of the 5G calling channel from the intermediate devices such as device B1 502 and further the hotspot device A 501 may not consider that channel (more particularly channel 5) for any sort of communication.

Figure 5:
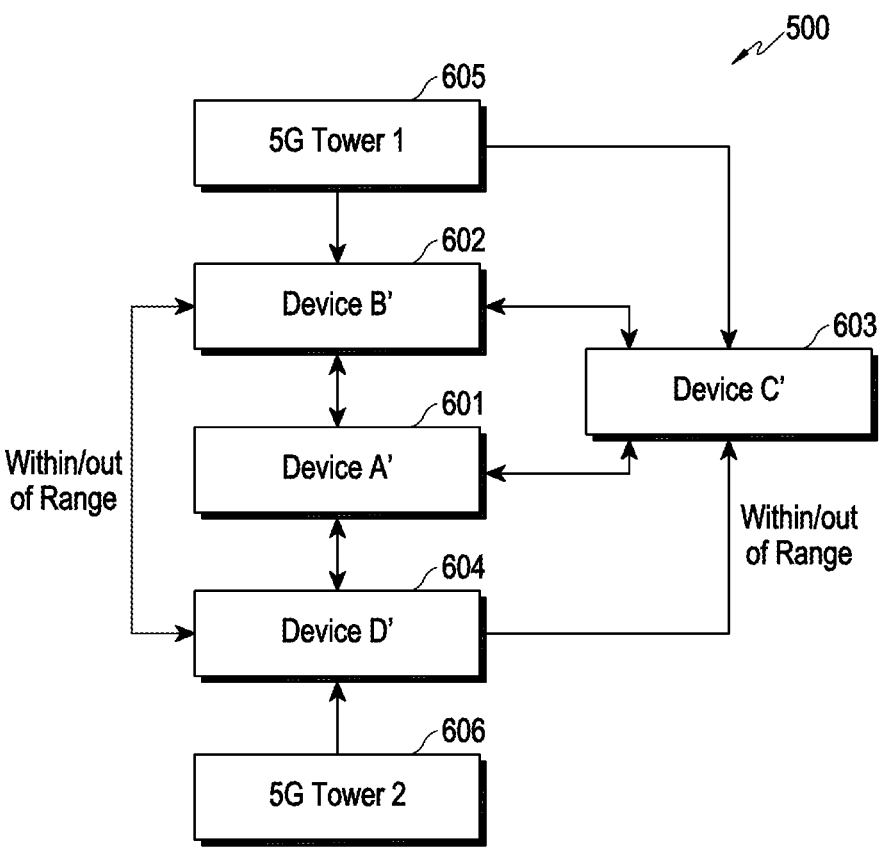
FIG. 5 illustrates another use case according to an example embodiment.

Referring to FIG. 5, another example user case according to an embodiment is illustrated. Consider four devices such as device A' 601, device B' 602, device C' 603 and device D' 604 respectively. The congestion observed at the device B' 602 is the sum of the congestion observed by the tower 1 605, the device C' 603 and the device A' 601. Further, the congestion observed at the device C' 603 is the sum of the congestion observed by the tower 1 605, the device B' 602 and the device A' 601. Further, the congestion observed at the device A' 601 is the sum of the congestion observed by the device B' 602, the device C' 603 and the device D' 604. Furthermore, the congestion observed at the device D' 604 is the sum of the congestion observed by the tower 2 606 and the device A' 601. With the implementation of certain example embodiments the congestion information is broadcasted in an extended frame by the devices B' 602, C' 603 and D' 604, so that the device A' 601 may acquire the information of congestion observed at device B' 602, C' 603 and D' 604 irrespective of the device being within the range or out of the range, for selecting the most preferred channel for communication and for enhancing the user's experience.

Each embodiment herein may be used in combination with any other embodiment(s) described herein.

Certain example embodiments may exemplify a method for selecting a Wi-Fi channel for mitigating interferences. The method 100 may facilitate increasing the throughput/network speed of the connection through optimal channel selection, thereby reducing the congestion while using the Mobile Hotspot. Furthermore, the method 100 may make efficient use of Wi-Fi Hotspot bandwidth, while also providing improved portability and client device user experience.

While at least one exemplary embodiment has been presented in the foregoing detailed description, it should be appreciated that a vast number of variations exist. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for selecting wireless fidelity (Wi-Fi) channel for mitigating and/or reducing interferences, the method comprising:

accumulating, by a mobile hotspot (MHS) device, packet information on each channel of a plurality of channels from a driver;

detecting, by the MHS device, presence of access points nearby the MHS device and determining a number of the access points on each channel;

determining, by the MHS device, a minimum value of received signal strength indication (RSSI);

determining, by the MHS device, congestion information from nearby devices being within a range of a user device;

calculating, by the MHS device, at least one weighted parameter, wherein the weighted parameter is calculated based on weighted packets per second, weighted number of the access points, and weighted minimum RSSI; and selecting, by the MHS device, a preferred channel to create a hotspot for communication between the (MHS) device and the user device based on the calculated at least one weighted parameter.

2. The method as claimed in claim 1, wherein the method further comprises:

receiving, by the MHS device, the packet information;

sending, by the MHS device, a probe request to the nearby devices; and receiving, by the MHS device, information from the nearby devices as at least part of a probe response, wherein the information comprises packet information, the number of the access points on each channel nearby the MHS device.

3. The method as claimed in claim 2, wherein the packet information comprises the-packets per second on each channel of the plurality of channels as perceived by the MHS device.

4. The method as claimed in claim 1, wherein the at least one weighted parameter is calculated using the equations:

$$\text{Packets weight} = \text{Packets } MHS + \sum (w \cdot f) \times \text{Packets nearby devices}$$

$$\text{Number of access points weighted} = \text{Number of access points } MHS +$$

$$\sum (w \cdot f) \times \text{Number of access points nearby devices}$$

$$\text{Min } RSSI \text{ weighted} =$$

$$\text{Minimum (Min } RSSI\ MHS,\ (1/w \cdot f) \times \text{Min } RSSI \text{ nearby devices)}.$$

5. The method as claimed in claim 1, wherein the number of the access points is retrieved using a WIFICond process, which returns the minimum value of RSSI by identifying various types of beacons.

6. The method as claimed in claim 1, wherein the minimum value of RSSI is retrieved from the beacons of the access points received at least via the driver.

7. The method as claimed in claim 1, wherein the at least one weighted parameter is computed using a weighing factor determined for each nearby device based on a proximity to the MHS device.

8. The method as claimed in claim 1, wherein the minimum value of RSSI is received for each channel of the plurality of channels in a vicinity of the MHS device.

9. The method as claimed in claim 1, wherein a peer congestion observer module, comprising circuitry, is triggered for sending the probe request by the MHS device to the nearby devices using a native packets sync module comprising circuitry.

10. The method as claimed in claim 9, wherein the packet information is stored and synced to the nearby devices by the native packets sync module.

11. A system for selecting wireless fidelity (Wi-Fi) channel for mitigating interferences, the system including at least one processor and comprising:

a packet information collector module, comprising processing circuitry, configured for accumulating packet information on each channel of a plurality of channels from a driver;

an access point detector module, comprising processing circuitry, configured for detecting presence of access points nearby a mobile hotspot (MHS) device, determining a number of the access points on each channel, and determining minimum value of received signal strength indication (RSSI);

a peer congestion observer module, comprising processing circuitry, configured for determining congestion information from nearby devices being within a range of a user device; and a channel selector module, comprising processing circuitry, configured for:

calculating at least one weighted parameter based on weighted packets per second, weighted number of the access points and weighted minimum RSSI; and selecting a preferred channel to create a hotspot for communication between the MHS device and the user device based on the at least one weighted parameter.

12. The system as claimed in claim 11, wherein the packet information collector module is configured to receive the packet information from a packet sniffer module comprising processing circuitry.

13. The system as claimed in claim 11, wherein the channel selector module is configured so that the at least one weighted parameter is calculated based on equations:

$$\text{Packets weight} = \text{Packets } MHS + \sum (w \cdot f) \times \text{Packets nearby devices}$$

$$\text{Number of access points weighted} = \text{Number of access points } MHS +$$

$$\sum (w \cdot f) \times \text{Number of access points nearby devices}$$

$$\text{Min } RSSI \text{ weighted} =$$

$$\text{Minimum (Min } RSSI \text{ } MHS, (1/w \cdot f) \times \text{Min } RSSI \text{ nearby devices).}$$

14. The system as claimed in claim 11, wherein the channel selector module is configured for collecting the information received from the packet information collector module, access point detector module, and peer congestion observer module for calculating the weighted parameter and determining the preferred channel to create the hotspot for communication between the MHS device and the user device.

15. The system as claimed in claim 11, wherein the packet information accumulated by the packet information collector module is to be stored and synced to the nearby devices by a native packet sync module comprising processing circuitry.

16. The system as claimed in claim 15, wherein the peer congestion observer module is triggered for sending a probe request by the MHS device to the nearby devices using the native packets sync module and receiving information from the nearby devices as at least part of a probe response.

17. The system as claimed in claim 16, wherein the information comprises packet information, and number of the access points on each channel nearby the MHS device.

18. The system as claimed in claim 12, wherein the packet sniffer module is configured for capturing packets on each channel, calculating packets frequency, and calculating the minimum value of RSSI on each channel of a plurality of channels.

* * * * *